Jan. 23, 1968        D. C. GUTERMAN ET AL        3,365,304
FROZEN CONFECTION AND METHOD OF PREPARATION
Filed Nov. 16, 1964

INVENTORS
DONALD C. GUTERMAN
GEORGE J. LORANT
DANIEL JAY LEVAN
Frederick F. Mack, Michael J. Quillinan
and Walter D. Ames.
ATTORNEYS

United States Patent Office 3,365,304
Patented Jan. 23, 1968

3,365,304
FROZEN CONFECTION AND METHOD
OF PREPARATION
Donald C. Guterman, New City, George J. Lorant, Scarborough, and Daniel Jay Levan, Nanuet, N.Y., assignors to General Foods Corporation, White Plains, N.Y., a corporation of Delaware
Filed Nov. 16, 1964, Ser. No. 411,534
9 Claims. (Cl. 99—136)

ABSTRACT OF THE DISCLOSURE

A frozen confection adapted to be contacted with water to form an ice cream soda comprising an ice cream body, a sweetening agent-containing syrup mass adhering to the ice cream body, and a block of carbonated ice adhering to the ice cream body and out of contact with the syrup mass is provided. A method of making the frozen confection and of packaging it in a container are also described.

---

This invention relates to a frozen confection suitable for dessert or between-meal consumption. More particularly, it relates to a frozen confection adapted to be mixed with an aqueous liquid to produce an ice cream soda, and to a method of forming the frozen confection.

Ice cream sodas have for generations enjoyed great popularity as confectionary products. Ice cream sodas are generally available at soda fountains and are ordinarily prepared by first mixing a syrup containing flavoring and sweetening ingredients with carbonated water and then adding ice cream to the mixture. Fruit or a topping of whipped cream or the like may also be added, but are not essential. The preparation of an ice cream soda at a soda fountain is usually accomplished economically and expeditiously; the soda may be quickly prepared and presented for consumption.

In the home, however, preparation of an ice cream soda is generally a difficult task. Even if all the ingredients necessary to prepare the soda are immediately at hand, mixing the syrup and carbonated water frequently results in a rapid loss of carbonation. When the ice cream is added, much of the carbonation has already passed from the water and the ice cream soda is flat and insipid. Moreover, a variety of syrups such as are necessary to produce ice cream sodas of different flavors are not generally maintained in the home. If they are, dispensing them is usually an untidy procedure, since the syrups are heavy bodied and tend to adhere to the spoon or other implement by means of which they are transferred to a glass containing carbonated water. As a consequence, home preparation of ice cream sodas has always been at a low level except in those few homes where the equivalent of a soda fountain dispensary is maintained.

It is an important object of the present invention to provide a frozen confection that can be mixed with a suitable quantity of water to produce an ice cream soda without the separate addition of syrup or carbonated water. It is a more specific object to provide a frozen confection which will yield an ice cream soda upon simple mixture with tap water.

It is a further object of the present invention to provide a method of making a confection which, upon mixture with a suitable quantity of water, forms an ice cream soda. It is a more specific object to provide such a method in which the frozen confection is packaged so as to permit easy release of the confection from its container without requiring manual contact with the confection itself.

According to the present invention, the frozen confection that forms an ice cream soda with a suitable quantity of water, is comprised of a body of ice cream, a mass of syrup adhered to the ice cream, and a block of carbonated ice likewise adhered to the ice cream. The mass of syrup and the block of carbonated ice, while both being adhered to the ice cream, are out of contact with each other.

In a preferred form, the body of ice cream is cylindrical in shape and circular in cross section, although this particular shape is only preferred, not mandatory. The cylinder of ice cream has the block of carbonated ice adhered to one of the cylinder surfaces, while a major portion of the side surface of the cylinder is coated with syrup. The syrup is out of contact with the carbonated ice since it does not coat that end surface of the cylinder which is occupied, at least in part, by the carbonated ice. Still more preferably, the end of the cylinder opposite that end to which the carbonated ice is adhered is free of syrup, which is confined solely to the continuous, tubular side surface of the cylinder of ice cream and occupies at least 75 percent of that side surface. However, a zone of the side surface adjacent to the cylinder end to which the carbonated ice is adhered remains free of syrup.

The method of the present invention is directed to making a confection which upon contact with a suitable quantity of water forms an ice cream soda. In that method, a quantity of syrup is dispensed in a tubular container having one end open and the other end closed until the syrup forms a thick layer against the closed end thereof. Then a body of ice cream is put into the container and, since the ice cream has a specific gravity less than the syrup, the ice cream tends to float in the syrup, depending on the dimensions of the container and ice cream body. The ice cream displaces portions of the syrup upwardly and about the ice cream and the syrup is frozen and thereby maintained in its displaced position. As more specifically defined, a block of carbonated ice is placed on one end of the cylinder of ice cream and a cover disposed over one end of the container. Since the ice cream and carbonated ice carried by the ice cream float in the syrup and extend upwardly beyond the end of the container, placing the cover over that open end depresses the ice cream and carbonated ice to displace more syrup. If, as is most preferred, the combined height of the cylinder of ice cream and the cylinder of carbonated ice approximately equals the length of the container, putting the cover on the container will push the cylinder of ice cream against the closed end of the container and thereby displace all of the syrup to a position in which it coats a major portion of the side surface of the cylinder of ice cream. Thus, all the syrup is located adjacent to the side surface of the ice cream.

These and other objects, features and advantages of the present invention will be better understood by reference to an illustration of a preferred, frozen confection and method of making same in the accompanying drawing, which forms a part hereof, and in which.

Figure 1:
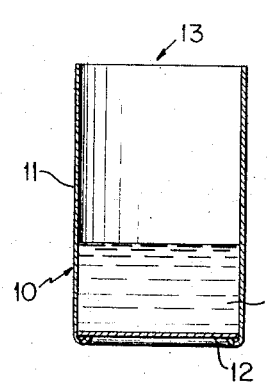
FIGURE 1 illustrates the first step in the preferred method of our invention in which syrup has been placed in a container.

Referring now to the drawing, and in particular to

Figure 4:
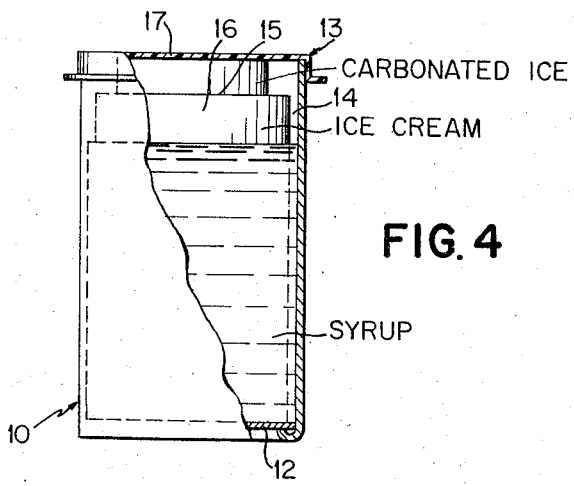
FIGURE 4 is an elevational view, partly cut away, of a preferred, frozen confection and container according to our invention.
Figure 5:
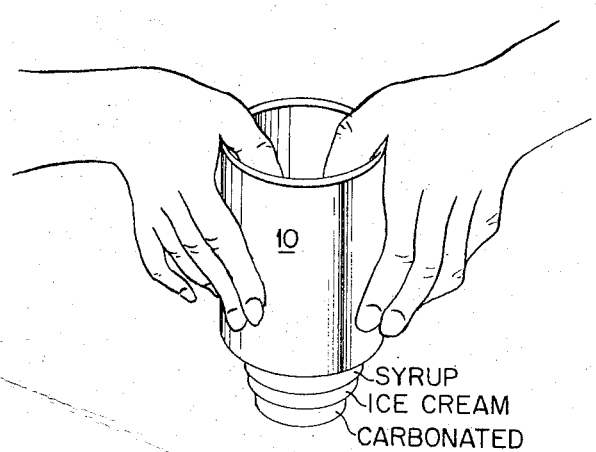
FIGURE 5 shows a preferred method of dispensing the frozen confection of FIGURE 4 from its container.

FIGURE 4 thereof, a preferred embodiment of the product of the present invention is illustrated therein. In that figure it will be seen that an elongated tubular container designated generally by reference 10 is formed with a side wall 11, a closed end having a bottom 12 and an initially open end indicated generally at 13. Within the container 10 is a mass of syrup, which surrounds a portion of a cylinder of ice cream that is positioned against the bottom 12 of the container 10. The cylinder of ice cream is substantially circular in cross section and has an elongated, continuous side surface. The mass of syrup occupies the space 14 between the side surface of the cylinder of ice cream and the side wall 11 of container 10. In such position the syrup contacts the side wall of the container and extends from the bottom 12 of the container upwardly as a continuous body to cover at least a major portion of the area of the side surface of the cylinder of ice cream, and preferably at least 75 percent of the area of the side surface. That portion of the side surface of the cylinder of ice cream adjoining the upwardly extending end 15 of the cylinder is designated by reference number 16.

Contiguous with the end 15 of the cylinder of ice cream is a block of carbonated ice. The carbonated ice is in the form of a cylinder that is circular in cross section and has a diameter less than the diameter of the ice cream cylinder. As located on the upwardly extending end 15 of the ice cream cylinder, the margin of the block of carbonated ice is inset from the margin of the ice cream cylinder. Preferably the block of carbonated ice is axially aligned with the ice cream cylinder.

The container top 17 is located at the initially open end 13 of the container 10 and effectively closes off that open end. In its container closing position, the cover 17 is in direct contact with one end surface of the carbonated ice cylinder. Thus, it keeps the ice cream cylinder and carbonated ice block from projecting upwardly beyond the end 13 bounded by the container walls. As illustrated in FIGURE 4, the dimensions of the ice cream cylinder and carbonated ice block are such that their combined height is substantially equal to the length of the cylinder 10 as measured from the upper surface of the bottom 12 of that cylinder to the plane of the margins of the end 13 of the cylinder. As such, the ice cream cylinder is in direct contact with the bottom 12 of container 10 by means of one end surface of the ice cream cylinder, so that none of the syrup separates the end of the ice cream cylinder from the bottom 12 of the container. The confection shown in FIGURE 4 is frozen in that form so that the syrup is solid and adheres to the side surface of the ice cream cylinder. Also, as frozen, the carbonated ice block adheres to the end of the ice cream cylinder, so that the entire frozen confection and its container present a unitary article the contents of which do not shift in transit.

Figure 2:
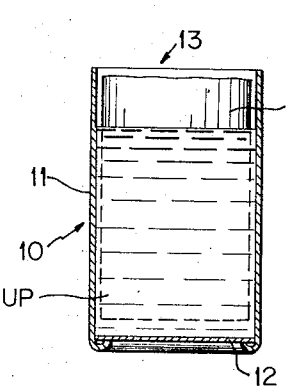
FIGURE 2 illustrates the second step of the method, in which a cylinder of ice cream has been placed in the container.
Figure 3:
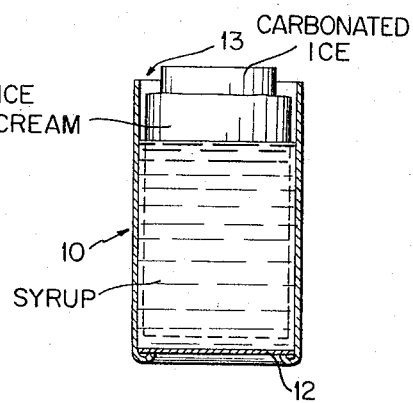
FIGURE 3 illustrates the third step in which a block of carbonated ice has been placed atop the cylinder of ice cream in the container.

The steps in the method of forming the packaged, frozen confection of FIGURE 4 are illustrated in FIGURES 1 to 3 of the drawing. In FIGURE 1, the container 10 having a bottom 12, a continuous, circular side wall 11 and an open end 13 is shown with a mass of syrup located therein and disposed against the bottom 12 of the container. In FIGURE 2 the container and syrup of FIGURE 1 are illustrated with a cylinder of ice cream, generally circular in cross section, located within the conainer 10. As so disposed, the cylinder of ice cream floats in the mass of syrup so that the syrup is located beneath the ice cream cylinder and also in the space 14 between the cylinder of ice cream and the container side wall 11. With the ice cream cylinder of the size illustrated in FIGURE 2, and the mass of syrup also shown therein, the ice cream cylinder will float and extend slightly below the open end 13 of container 10.

In FIGURE 3 of the drawing, the same container 10 as illustrated in FIGURES 1 and 2 is shown with a block of carbonated ice having been placed atop the upper end 15 of the ice cream cylinder. The carbonated ice is also circular in cross section and, while its added weight does depress the cylinder of ice cream somewhat in the mass of syrup, the block of carbonated ice extends somewhat above the plane of the margins of open end 13 of the container 10 and the ice cream cylinder has not been depressed to a point where it is in firm contact with the bottom wall 12 of the container. The cover 17 is then placed over the open end 13 of the container 10 to result in the confection illustrated in FIGURE 4 of the drawing, which is then brought to a temperature below about 0° F., preferably to about minus 10° F., to freeze the syrup and maintain the syrup in its displaced position.

Illustrated in FIGURE 4 is one method of dispensing the frozen confection of the present invention from its container 10. As shown, the container 10 is inverted and the thumbs of both hands are placed against the bottom wall 12 of the container and pressed inwardly. With the container inverted and cover 17 removed, the removable bottom wall 12 will be pushed in the direction of the open end 13 of the container 10. In so moving, the bottom will push the syrup, ice cream and carbonated ice from the container into a glass or other receptacle, which may have water in it or to which water may then be added. In this position, the block of carbonated ice is immersed in the water and reacts with the water to liberate carbon dioxide gas. The gas bubbles up through the water or other aqueous liquid in the receptacle and forms a froth with the syrup and ice cream so that the drink resembles an ice cream soda prepared at a soda fountain. The syrup which coats the side wall of the ice cream cylinder is also immersed in the water and dissolves, thus providing sweetening, color and flavor to the ice cream soda formed. There is preferably no syrup on the end surface of the ice cream cylinder that contacted the bottom wall 12 of container 10. Thus, there is no syrup to dissolve from a location in which it will generally have to be forced under the water used to form the ice cream soda by means of a spoon or other implement, as the confection tends to float in water. After the bottom wall 12 has been pushed by the thumbs so that the syrup, ice cream and carbonated ice have fallen into the receptacle located beneath the frozen confection, the container 10 and its bottom wall are discarded.

The term, carbonated ice, as used in this specification is intended to refer to a wide variety of physical and chemical combinations of carbon dioxide and water ice. A particularly useful carbonated ice is that which is described in U.S. Patent No. 2,975,603 to Barnes et al. and which contains more than 25 ml. of carbon dioxide in gaseous form per gram of ice. While the carbonated ice product disclosed in that patent is particularly well suited for the preparation of an ice cream soda because of its high level of carbon dioxide produced upon contact with water, carbonated ice, whether it be in the form of a mere encapsulation of carbon dioxide in water ice or in the form of a clathrate of hydrate of carbon dioxide and water, may also find use. Thus, carbonated ices having at least about 10 ml. of carbon dioxide per gram of ice are also quite useful and are intended to be included within the scope of the term, carbonated ice.

As used herein, the term, ice cream, is generally intended to cover frozen desserts and dessert compositions that include milk, water, cream, and the like. They may be in a wide variety of flavors, and may be more specifically known by those skilled in the art as frozen custard, French ice cream, ice milk, sherbet, and by other names. The ice cream may be prepared from a variety of mixes and may contain a wide range of fat, sugar, edible gums, and other ingredients.

Referring to the term, syrup, as used in the present invention, by syrup is meant a composition that is semi-solid or liquid at room temperatures and that contains a sweetening agent, which may be sugar or artificial sweetening agents or combinations of both. The syrup will generally also contain flavoring ingredients such as chocolate, cocoa, vanilla, coffee, strawberry, and the like, and a viscosity altering agent such as gum arabic, gum karaya, gelatin and the like. Other ingredients will be those which are normally present in commercial syrups.

The shape of the body of ice cream is not critical to the present invention although, of course, it must have a shape which will fit within the container in which it is to be housed. Certain shapes are preferred, however, and a shape that is particularly preferred is that of a cylinder. By cylinder is not restrictively meant the volume generated by a rectangle rotated around one parallel side as an axis, but also an elongated tube, which, in cross section, is rectangular, pentagonal, hexagonal, etc., or has an irregular shape in cross section. The material from which the container is formed may be any of a wide variety, for example, paper, plastic, glass or metal.

The present invention will be better understood by reference to the following example of a preferred embodiment of our packaged, frozen confection and a method of forming it.

EXAMPLE

Carbonated ice containing about 35 ml. of carbon dioxide in gaseous form per gram of ice was prepared according to the process described in U.S. Patent No. 2,975,603 to Barnes et al. A cylindrical briquette of this carbonated ice was formed.

A flavored and sweetened syrup was separately prepared, the syrup being obtained by mixing quantities of the following ingredients:

| | Grams |
|---|---|
| Water | 194 |
| Sugar | 154 |
| Cocoa | 29 |
| Vanilla extract | 3 |
| Sodium cyclamate-saccharin (3/1) | 0.5 |

Forty-five grams of chocolate syrup having the above formula were placed in a cylindrical, paperboard container. Then 55 grams of a cylinder of vanilla ice cream having a diameter substantially less than the diameter of the container was placed in the container and floated in the syrup. Then an 18-gram cylindrical briquette of carbonated ice was placed on top of the ice cream. The addition of the carbonated ice briquette, the diameter of which was less than the diameter of the cylindrical body of ice cream, tended to depress the body of ice cream to a point further within the mass of syrup. At this point the upper surface of the block of carbonated ice extended somewhat above the plane of the open end of the container. A plastic top was then placed over that opening and against the block of carbonated ice, pressing on the carbonated ice and depressing the cylinder of ice cream further into the container so that the cylinder of ice cream was forced against the bottom of the container. This resulted in displacement of all the syrup to a location between the side surface of the cylinder of ice cream and the side wall of the container. The container, ice cream, and carbonated ice were all in axial alignment. The confection was then frozen to a temperature of −10° F.

The above process was carried out at room temperature, although the specific ingredients used were not at room temperature. While the carbonated ice was at a temperature of about 0° F., the syrup, which was still mobile, was at about 30° F., and the frozen ice cream was at a temperature of about 20° F. Upon subsequent removal of the confection from the room temperature and lowering the temperature thereof to −10° F., the syrup likewise froze so that, upon inversion of the container, the syrup remained in a displaced position.

To make an ice cream soda from the confection so prepared, the cover of the container was removed, the container inverted, and inward pressure applied against the bottom of the container. A 12-ounce glass was positioned beneath the container and the carbonated ice, ice cream and syrup, all adhered together, were forced into the glass, the carbonated ice being deposited within the glass container as the lowermost part of the confection. Six ounces of tap water at a temperature of about 60° F. were then added to the glass receptacle and after a short wait, the confection was stirred. A small quantity of milk might have been added if a richer soda were desired. The chocolate ice cream soda produced bore a strong resemblance to an ice cream soda ordinarily procured at a soda fountain. During consumption of the ice cream soda, the carbonated ice continued to release gaseous carbon dioxide and, consequently, a continuous foaming action was observed and had an impact on the taste.

It will be apparent that certain alterations and modifications will obviously be made by those skilled in the art in the present invention as delineated in the foregoing specification and the example of a preferred embodiment thereof. All such obvious alterations and modifications are deemed to be included within the scope of our invention, which is to be limited only by the purview of the following appended claims.

What is claimed is:

1. A frozen confection which upon contact with a suitable quantity of water forms an ice cream soda, comprising a body of ice cream having side surfaces and opposed end surfaces, a mass of syrup containing a sweetening agent coating and adhered to a major portion of said side surfaces of said body of ice cream, and a block of carbonated ice adhered to one of said end surfaces of said body of ice cream and out of contact with said mass of syrup.

2. A frozen confection which upon contact with a suitable quantity of water forms an ice cream soda, comprising an elongated body of ice cream in the shape of a cylinder having at least one side surface and opposed end surfaces, a mass of syrup containing a sweetening agent adhered to said body of ice cream and covering at least 75 percent of the area of said side surface, and a block of carbonated ice adhered to one of said end surfaces of said body of ice cream and out of contact with said mass of syrup.

3. A frozen confection as claimed in claim 2, in which an area of said side surface of said cylinder of ice cream adjacent to said one end surface of said cylinder is substantially free of syrup.

4. A frozen confection which upon contact with a suitable quantity of water forms an ice cream soda, comprising a body of ice cream in the form of an elongated cylinder that is circular in cross section and has a continuous tubular side surface and opposed end surfaces, a mass of syrup containing a sweetening agent adhered only to said side surface of said body of ice cream, and a block of carbonated ice adhered to said body of ice cream at one of said end surfaces thereof.

5. A frozen confection which upon contact with a suitable quantity of water forms an ice cream soda, comprising a body of ice cream in the form of an elongated cylinder that is circular in cross section and has a continuous tubular side surface and opposed, substantially planar end surfaces, a mass of syrup containing a sweetening agent adhered to said side surface of said body of ice cream, and a cylindrical block of carbonated ice adhered to said body of ice cream at one of said end surfaces thereof and having its margins inset from the margins of said body of ice cream.

6. A method of making a confection which upon contact with a suitable quantity of water forms an ice cream soda, comprising dispensing a quantity of syrup containing a sweetening agent in a tubular container having one end open and the other end closed until the syrup forms a thick layer against the closed end of the container, disposing a body of ice cream having a specific gravity less than that of the syrup in the container so that the ice cream floats in the layer of syrup and the syrup contacts surface portions of the body of ice cream, locating a block of carbonated ice on the body of ice cream, pressing the carbonated ice so that the ice cream is forced into the syrup to displace a portion thereof to a position in which the syrup rises in the container and contacts additional surface portions of the ice cream, and freezing the syrup to maintain it in its displaced position.

7. A method of making a confection which upon contact with a suitable quantity of water forms an ice cream soda, comprising dispensing a quantity of syrup containing a sweetening agent in a tubular container having one end open and the other end closed until the syrup forms a thick layer against the closed end of the container, disposing a body of ice cream having a specific gravity less than that of the syrup in the container so that the ice cream floats in the layer of syrup and the syrup contacts surface portions of the body of ice cream, the floating body of ice cream extending beyond the open end of the container locating a block of carbonated ice on the floating body of ice cream, positioning a cover over the open end of the container and thereby pressing the carbonated ice so that the ice cream is forced into the syrup to displace a portion thereof to a position in which the syrup rises in the container and contacts additional surface portions of the ice cream, and freezing the syrup to maintain it in its displaced position.

8. A method of making a confection which upon contact with a suitable quantity of water forms an ice cream soda, comprising dispensing a quantity of syrup containing a sweetening agent in a tubular container having one end open and the other end closed until the syrup forms a thick layer against the closed end of the container, disposing a body of ice cream having a specific gravity less than that of the syrup in the container so that the ice cream floats in the layer of syrup and the syrup contacts surface portions of the body of ice cream, locating a block of carbonated ice on the floating body of ice cream so that the carbonated ice extends beyond the open end of the container, positioning a cover over the open end of the container and thereby pressing the carbonated ice so that the ice cream is forced into the syrup to displace a portion thereof to a position in which the syrup rises in the container and contacts additional surface portions of the ice cream, and freezing the syrup to maintain it in its displaced position.

9. A method of making a confection which upon contact with a suitable quantity of water forms an ice cream soda, comprising dispensing a quantity of syrup containing a sweetening agent in a tubular container having one end open and the other end closed until the syrup forms a thick layer against the closed end of the container, disposing a body of ice cream having a specific gravity less than that of the syrup in the container so that the ice cream floats in the layer of syrup and the syrup contacts surface portions of the body of ice cream, locating a block of carbonated ice on the floating body of ice cream so that the carbonated ice extends beyond the open end of the container, the sum of the lengths of the body of ice cream and the block of carbonated ice approximately equaling the length of the container, positioning a cover over the open end of the container and thereby pressing the carbonated ice so that the ice cream is forced into the syrup and against the closed end of the container to displace the syrup to a position in which it rises in the container and contacts additional surface portions of the ice cream, and freezing the syrup to maintain it in its displaced position.

References Cited

UNITED STATES PATENTS

| | | | |
|---|---|---|---|
| 468,631 | 2/1892 | Allen | 99—136 |
| 2,080,920 | 7/1935 | Ingalls | 99—136 |
| 2,975,603 | 3/1961 | Barnes | 99—79 XR |
| 3,061,443 | 10/1962 | McLaughlin | 99—136 |

A. LOUIS MONACELL, *Primary Examiner.*

J. M. HUNTER, *Assistant Examiner.*